(12) United States Patent
Yoshida et al.

(10) Patent No.: US 10,457,322 B2
(45) Date of Patent: Oct. 29, 2019

(54) MOTOR CONTROL UNIT AND ELECTRIC POWER STEERING APPARATUS EQUIPPED WITH THE SAME

(71) Applicant: NSK Ltd., Tokyo (JP)

(72) Inventors: Keita Yoshida, Maebashi (JP); Yousuke Imamura, Maebashi (JP)

(73) Assignee: NSK LTD., Tokyo (JP)

( * ) Notice: Subject to any disclaimer, the term of this patent is extended or adjusted under 35 U.S.C. 154(b) by 95 days.

(21) Appl. No.: 15/559,123

(22) PCT Filed: Apr. 5, 2016

(86) PCT No.: PCT/JP2016/061061
§ 371 (c)(1),
(2) Date: Sep. 18, 2017

(87) PCT Pub. No.: WO2016/163343
PCT Pub. Date: Oct. 13, 2016

(65) Prior Publication Data
US 2018/0273090 A1     Sep. 27, 2018

(30) Foreign Application Priority Data

Apr. 10, 2015  (JP) .................................. 2015-080664

(51) Int. Cl.
*B62D 5/04* (2006.01)
*B62D 6/00* (2006.01)
(Continued)

(52) U.S. Cl.
CPC ........... *B62D 6/008* (2013.01); *B62D 5/0463* (2013.01); *B62D 5/0481* (2013.01); *H02P 21/22* (2016.02); *B62D 6/10* (2013.01)

(58) Field of Classification Search
CPC .... B62D 6/008; B62D 5/0463; B62D 5/0481; B62D 6/10; H02P 21/22
See application file for complete search history.

(56) References Cited

U.S. PATENT DOCUMENTS 5,482,129 A    1/1996  Shimizu
9,362,860 B2 * 6/2016  Sugawara ................. H02P 6/28
(Continued)

FOREIGN PATENT DOCUMENTS

EP    0943528 A2    9/1999
EP    1900608 A1    3/2008
(Continued)

OTHER PUBLICATIONS

Communication dated Oct. 22, 2018, from European Patent Office in counterpart application No. EP16776509.
(Continued)

*Primary Examiner* — Kevin Hurley
(74) *Attorney, Agent, or Firm* — Sughrue Mion, PLLC

(57) ABSTRACT

[Problem]
An object of the present invention is to provide a motor control unit that achieves desired performance more simply with higher accuracy by setting a frequency characteristic according to a state of the control unit and automatically adjusting a control gain by the set value, and to provide an electric power steering apparatus equipped with the same.
[Means for Solving the Problem]
A motor control unit that comprises a current command value calculating section that calculates a current command value of a motor applying a steering assist torque to a steering system of a vehicle, and a feedback section that controls a motor current flowing to the motor through a feedback mechanism based on the current command value comprises: a control unit state detecting section that detects at least one state of the motor control unit, and outputs the state as a control unit state; and a characteristic changing section that changes a setting of a closed loop response characteristic of the feedback section in real time depending on the control unit state.

17 Claims, 12 Drawing Sheets

(51) Int. Cl.
H02P 21/22 (2016.01)
B62D 6/10 (2006.01)

(56) References Cited

U.S. PATENT DOCUMENTS

| | | | | |
|---|---|---|---|---|
| 2009/0167224 A1* | 7/2009 | Miura | ................... | B62D 5/046 |
| | | | | 318/400.23 |
| 2009/0322268 A1* | 12/2009 | Imamura | ................ | B62D 5/046 |
| | | | | 318/400.23 |
| 2013/0285591 A1* | 10/2013 | Suzuki | ................... | H02P 25/22 |
| | | | | 318/724 |
| 2015/0088381 A1* | 3/2015 | Imamura | ............. | B62D 5/0472 |
| | | | | 701/41 |
| 2017/0279394 A1* | 9/2017 | Miura | ....................... | H02P 6/08 |
| 2018/0170422 A1* | 6/2018 | Yoshida | ................ | B62D 5/046 |
| 2018/0278189 A1* | 9/2018 | Zhang | ................... | B62D 5/046 |

FOREIGN PATENT DOCUMENTS

| JP | 471959 A | 3/1992 |
|---|---|---|
| JP | 06-028006 A | 2/1994 |
| JP | 2008-055994 A | 3/2008 |
| JP | 2011111080 A | 6/2011 |
| JP | 5034633 A | 9/2012 |
| JP | 5548645 B2 | 7/2014 |

OTHER PUBLICATIONS

International Search Report of PCT/JP2016/061061 dated Jun. 14, 2016.

* cited by examiner

MOTOR CONTROL UNIT AND ELECTRIC POWER STEERING APPARATUS EQUIPPED WITH THE SAME

CROSS REFERENCE TO RELATED APPLICATIONS

This application is a National Stage of International Application No. PCT/JP2016/061061 filed Apr. 5, 2016, claiming priority based on Japanese Patent Application No. 2015-080664 filed Apr. 10, 2015, the contents of all of which are incorporated herein by reference in their entirety.

TECHNICAL FIELD

The present invention relates to a motor control unit that controls a motor current flowing to a motor through a feedback mechanism on the basis of a current command value being a steering command, and in particular to a motor control unit that can change a characteristic of the feedback mechanism in real time, and an electric power steering apparatus equipped with the same.

BACKGROUND ART

An electric power steering apparatus (EPS) which assists and control a steering system of a vehicle by means of a rotational torque of a motor, applies a driving force of the motor as a steering assist torque (an assist torque) to a steering shaft or a rack shaft by means of a transmission mechanism such as gears or a belt through a reduction mechanism. In order to accurately generate the steering assist torque, such a conventional electric power steering apparatus performs feedback control of a motor current. The feedback control adjusts a voltage supplied to the motor so that a difference between a current command value and a detected motor current value becomes small, and the adjustment of the voltage supplied to the motor is generally performed by an adjustment of a duty ratio of pulse width modulation (PWM) control.

A general configuration of the electric power steering apparatus will be described with reference to FIG. 1. As shown in FIG. 1, a column shaft (a steering shaft or a handle shaft) 2 connected to a steering wheel 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque of the steering wheel 1 and a steering angle sensor 14 for detecting a steering angle θ, and a motor 20 for assisting a steering force of the steering wheel 1 is connected to the column shaft 2 through the reduction gears 3. The electric power is supplied to a control unit (ECU) 30 for controlling the electric power steering apparatus from a battery 13, and an ignition key (IG) signal is inputted into the control unit 30 through an ignition key 11. The control unit 30 calculates a current command value of an assist (steering assist) command on the basis of a steering torque Ts detected by the torque sensor 10 and a vehicle speed Vs detected by a vehicle speed sensor 12, and controls a current supplied to the motor 20 for the EPS by means of a voltage control command value Vref obtained by performing compensation or the like to the current command value.

Moreover, the steering angle sensor 14 is not essential, it does not need to be provided, and it is possible to obtain the steering angle from a rotation sensor such as a resolver connected to the motor 20.

A controller area network (CAN) 100 exchanging various information of a vehicle is connected to the control unit 30, and it is possible to receive the vehicle speed Vs from the CAN 100. Further, it is also possible to connect a non-CAN 101 exchanging a communication, analog/digital signals, a radio wave or the like except with the CAN 100 to the control unit 30.

The control unit 30 mainly comprises an MCU (including a CPU, an MPU and so on), and general functions performed by programs within the MCU are shown in FIG. 2.

Functions and operations of the control unit 30 will be described with reference to FIG. 2. As shown in FIG. 2, the steering torque Ts detected by the torque sensor 10 and the vehicle speed Vs detected by the vehicle speed sensor 12 (or from the CAN 100) are inputted into a current command value calculating section 31 that calculates a current command value 'ref'. The current command value calculating section 31 calculates the current command value Iref1 that is a control target value of a motor current supplied to the motor 20 on the basis of the inputted steering torque Ts and the inputted vehicle speed Vs and by using an assist map or the like. The current command value 'ref' is inputted into a current limiting section 33 through an adding section 32A. A current command value Irefm the maximum current of which is limited is inputted into a subtracting section 32B, and a deviation I (=Irefm−Im) between the current command value Irefm and a motor current value Im being fed back is calculated. The deviation I is inputted into a proportional integral (PI) control section 35 for improving a characteristic of the steering operation. The voltage control command value Vref whose characteristic is improved by the PI-control section 35 is inputted into a PWM-control section 36. Furthermore, the motor 20 is PWM-driven through an inverter 37 serving as a driving section. The motor current value Im of the motor 20 is detected by a motor current detector 38 and is fed back to the subtracting section 32B. The inverter 37 uses field effect transistors (FETs) as driving elements and is comprised of a bridge circuit of FETs.

A compensation signal CM from a compensation signal generating section 34 is added to the adding section 32A, and a characteristic compensation of the steering system is performed by the addition of the compensation signal CM so as to improve a convergence, an inertia characteristic and so on. The compensation signal generating section 34 adds a self-aligning torque (SAT) 34-3 and an inertia 34-2 at an adding section 34-4, further adds the result of addition performed at the adding section 34-4 with a convergence 34-1 at an adding section 34-5, and then outputs the result of addition performed at the adding section 34-5 as the compensation signal CM.

In such an electric power steering apparatus, on the one hand it is desired to set responsibility of a current control system high in order to improve sense of unity of a vehicle and driver's steering, but on the other hand it is desired to enhance noise immunity in order to reduce a sound and a vibration that are caused by a detection noise included in a steering torque obtained from a sensor and a detected motor current value. However, it is generally difficult to make these two compatible because the noise immunity decreases when the responsibility of the current control system is made high.

As a method to solve this, for example, two-degree-of-freedom control has been utilized. The two-degree-of-freedom control is a control system capable of independently setting two control characteristics that one is a feedback characteristic such as robust stability and a disturbance removal characteristic and the other is an output response characteristic to a target value (a target value response characteristic). The two-degree-of-freedom control is constituted of two elements, a feedback control element and a feedforward control element. The feedback characteristic is set by the element of the former, and the target value response characteristic is set by the element of the latter. In applying the two-degree-of-freedom control to an electric power steering apparatus, it is possible to individually set a target value response characteristic from a current command value to a motor current value and a feedback characteristic of a feedback mechanism. Both this target value response characteristic and this feedback characteristic affect the responsibility and the noise immunity, in particular, the target value response characteristic greatly contributes the responsibility, and the feedback characteristic greatly contributes the noise immunity, so that setting these characteristics individually enables compatibility of mutually exclusive performances.

The control method utilizing the two-degree-of-freedom control has been proposed, for example, in the publication of Japanese Patent No. 5034633 B2 (Patent Document 1). The method in Patent Document 1 makes the responsibility and the noise immunity compatible to a high degree by considering a delay of operation time in a coefficient of a controller used as a feedforward control element and a feedback control element, and configuring a controller (a feedback control element) in a closed loop with two degrees or more.

However, a demand for performance of the controller has been upgraded year after year, and even if such a method as in Patent Document 1 makes the responsibility and the noise immunity compatible to a high degree, there is the case where a response is insufficient since a demanded performance is changed in accordance with a state of an electric power steering apparatus (EPS). For example, in the majority range of vehicle speed, it is desired that a vehicle follows even minute steering rather than performance for a noise. Accordingly, in order to enhance the responsibility, it is desirable to set both a response frequency in the target value response characteristic (a command value response frequency) and a response frequency in the feedback characteristic (a closed loop response frequency) high. On the other hand, at a very low vehicle speed such as during stop and during creep travelling, sensitivity to the above sound and the vibration that are caused by the detection noise increases, in particular, they are notably felt in steering holding, so that it is necessary to enhance the noise immunity, and it is desirable to set the closed loop response frequency low. Thus, the performance required in states of the vehicle speed is in the relation of trade-off. Though the control method to which a function of adjusting a gain of the feedback characteristic on the basis of a motor angular velocity being one of EPS states is added, is proposed in Patent Document 1, configuring a controller that is capable of changing a characteristic in accordance with the EPS state with a higher degree of freedom, is needed.

There is, for example, a method proposed in the publication of Japanese Patent No. 5548645 B2 (Patent Document 2) as a method of changing the characteristic of the controller according to the EPS state. The method in Patent Document 2 changes the characteristic of the controller according to the EPS state by determining a correction gain depending on a vehicle state or a steering state, and correcting a proportional (P) gain and an integral (I) gain of a d-axis current controller.

THE LIST OF PRIOR ART DOCUMENTS

Patent Documents

Patent Document 1: Japanese Patent No. 5034633 B2
Patent Document 2: Japanese Patent No. 5548645 B2

SUMMARY OF THE INVENTION

Problems to be Solved by the Invention

However, generally, a performance estimation of the EPS is often performed in a frequency domain. This is because main indexes of the estimation (a sound, a vibration, responsibility, etc.) are analyzed with respect to an amplitude and a frequency, and are often related to a resonance frequency, an operation period or the like. Herewith, respective control gains are also designed by using a frequency characteristic of the controller as the index. For this reason, in such a method of directly correcting the control gain as in Patent Document 2, it is necessary to advance the design with confirming a change of the frequency characteristic to a change of the control gain in designing, and a plurality of control gains are adjusted simultaneously, so that the design is difficult and needs time. Further, it is hard to understand what kind of a frequency characteristic the controller has from setting of the control gain, and tuning at a delivery destination of a product is also very difficult. Furthermore, a change amount of the control gain and a change amount of the response frequency are not necessarily matched, and there is a possibility of not generating a desired characteristic.

The present invention has been developed in view of the above-described circumstances. The method of configuring a controller that is capable of making the responsibility and the noise immunity compatible to a higher degree by providing a controller making them compatible to a certain degree and a mechanism changing the control gain according to the state, has been proposed. However, it is very difficult to estimate a complicated controller whose performance is relationally affected by a plurality of control gains, such as a controller performing two-degree-of-freedom control, by adjusting the control gain according to respective states of the EPS and by means of the frequency characteristic being in another dimension, and there is a possibility of not achieving desired performance.

Accordingly, the object of the present invention is to provide a motor control unit that achieves desired performance more simply with higher accuracy by providing a function having a method, which performs adjustment in order reverse to a conventional method, where "the frequency characteristic is not changed by setting the control gain" according to the state, but "the control gain is automatically adjusted by setting the frequency characteristic" according to the state, and to provide an electric power steering apparatus equipped with the same.

Means for Solving the Problems

The present invention relates to a motor control unit that comprises a current command value calculating section that calculates a current command value of a motor applying a steering assist torque to a steering system of a vehicle, and a feedback section that controls a motor current flowing to the motor through a feedback mechanism based on the current command value, the above-described object of the present invention is achieved by that comprising: a control unit state detecting section that detects at least one state of the motor control unit, and outputs the state as a control unit state; and a characteristic changing section that changes a setting of a closed loop response characteristic of the feedback section in real time depending on the control unit state; wherein the characteristic changing section calculates a setting for changing a stationary gain and a response frequency as the setting of the closed loop response characteristic by using a predefined relationship between the control unit state and the stationary gain and a predefined relationship between the control unit state and the response frequency.

The above-described object of the present invention is more effectively achieved by that wherein the characteristic changing section comprises a stationary gain calculating section that calculates a set value of the stationary gain depending on the control unit state, a response frequency calculating section that calculates a set value of the response frequency depending on the control unit state, and a coefficient calculating section that calculates coefficients of a transfer function of a control section in the feedback section, the coefficients being used to achieve each set value of the stationary gain and the response frequency; or wherein a change amount of the calculated set value is limited so as not to exceed a predetermined value in at least one between the response frequency calculating section and the stationary gain calculating section; or wherein the motor control unit calculates an individual set value according to the control unit state in at least one between the response frequency calculating section and the stationary gain calculating section, comprises a priority determining section that calculates a set priority for the control unit state, calculates a final set value depending on the individual set value and the set priority, and inputs the final set value into the coefficient calculating section; or wherein the motor control unit calculates an individual set value according to the control unit state in at least one between the response frequency calculating section and the stationary gain calculating section, and inputs a maximum value among the individual set values into the coefficient calculating section; or wherein a configuration of the feedback section is a configuration of two-degree-of-freedom control where the closed loop response characteristic and a command value response characteristic are possible to set individually, and wherein the characteristic changing section calculates a setting for changing a closed loop response stationary gain and a closed loop response frequency as the setting of the closed loop response characteristic by using a predefined relationship between the control unit state and the closed loop response stationary gain and a predefined relationship between the control unit state and the closed loop response frequency, and calculates a setting for changing a command value response stationary gain and a command value response frequency as a setting of the command value response characteristic by using a predefined relationship between the control unit state and the command value response stationary gain and a predefined relationship between the control unit state and the command value response frequency; or wherein the characteristic changing section comprises a stationary gain calculating section that calculates set values of the closed loop response stationary gain and the command value response stationary gain depending on the control unit state, a response frequency calculating section that calculates set values of the closed loop response frequency and the command value response frequency depending on the control unit state, and a coefficient calculating section that calculates coefficients of a transfer function of a control section in the feedback section, the coefficients being used to achieve each set value of the closed loop response stationary gain, the command value response stationary gain, the closed loop response frequency and the command value response frequency; or wherein a change amount of the calculated set value is limited so as not to exceed a predetermined value in at least one between the response frequency calculating section and the stationary gain calculating section; or wherein the motor control unit calculates an individual set value according to the control unit state in at least one between the response frequency calculating section and the stationary gain calculating section, comprises a priority determining section that calculates a set priority for the control unit state, calculates a final set value depending on the individual set value and the set priority, and inputs the final set value into the coefficient calculating section; or wherein the motor control unit calculates an individual set value according to the control unit state in at least one between the response frequency calculating section and the stationary gain calculating section, and inputs a maximum value among the individual set values into the coefficient calculating section; or wherein the control unit state is at least one among the current command value, the motor current, a motor angular velocity, a motor angular acceleration and a motor temperature.

An electric power steering apparatus possible to control more simply with higher accuracy is achieved by that equipped with the above motor control unit, and wherein the control unit state is at least one among the current command value, the motor current, a motor angular velocity, a motor angular acceleration, a motor temperature, a steering torque, a steering angle, a steering angular velocity and a vehicle speed.

Effects of the Invention

The motor control unit of the present invention enables flexible compatibility of responsibility and noise immunity by changing a characteristic of the feedback mechanism depending on the state of the control unit. Moreover, it is possible to design a desired characteristic by enabling design of the response frequency and the stationary gain corresponding to the state of the control unit.

Moreover, the electric power steering apparatus equipped with the motor control unit according to the present invention, enables smooth handling by an appropriate assist.

MODE FOR CARRYING OUT THE INVENTION

The present invention changes a characteristic from a current command value to a motor current value (a command value response characteristic) and a characteristic of a feedback mechanism performing feedback control of a motor current (a closed loop response characteristic) depending on a state of a control unit (a control unit state) such as a vehicle speed and a motor angular velocity. Specifically, the present invention calculates response frequencies and stationary gains of the command value response characteristic and the closed loop response characteristic respectively in accordance with the control unit state detected by a control unit state detecting section. Thus, controlling two characteristics (the command value response characteristic and the closed loop response characteristic) individually enables compatibility of responsibility and noise immunity, and changing the characteristic automatically depending on the control unit state enables an appropriate control.

In order to calculate the response frequency and the stationary gain, the present invention prepares maps that define a relationship between each control unit state and the response frequency and a relationship between each control unit state and the stationary gain respectively, and calculates them by using the maps. Therefore, since it is possible to directly adjust the response frequency and the stationary gain of each characteristic by adjusting the map in design of the unit or prior adjustment, a desired characteristic is possible to set. Moreover, it is possible to define the relationship between each control unit state and the response frequency and the relationship between each control unit state and the stationary gain respectively by not using the map, but using a function or the like.

Coefficients of a transfer function of a control section in a feedback section are automatically calculated from the calculated response frequency and the calculated stationary gain.

Hereinafter, an embodiment of the present invention will be described with reference to the accompanying drawings.

Figure 2:
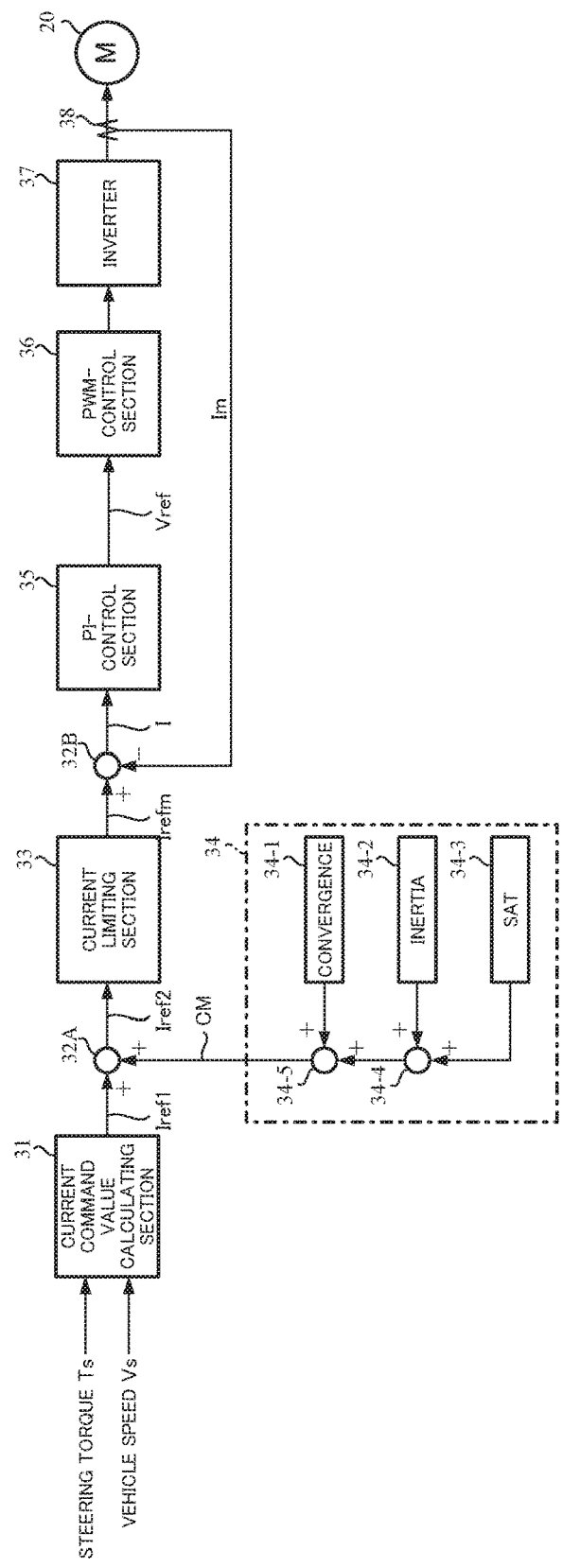
FIG. 2 is a block diagram showing a configuration example of a control unit (ECU) of the electric power steering apparatus.
Figure 3:
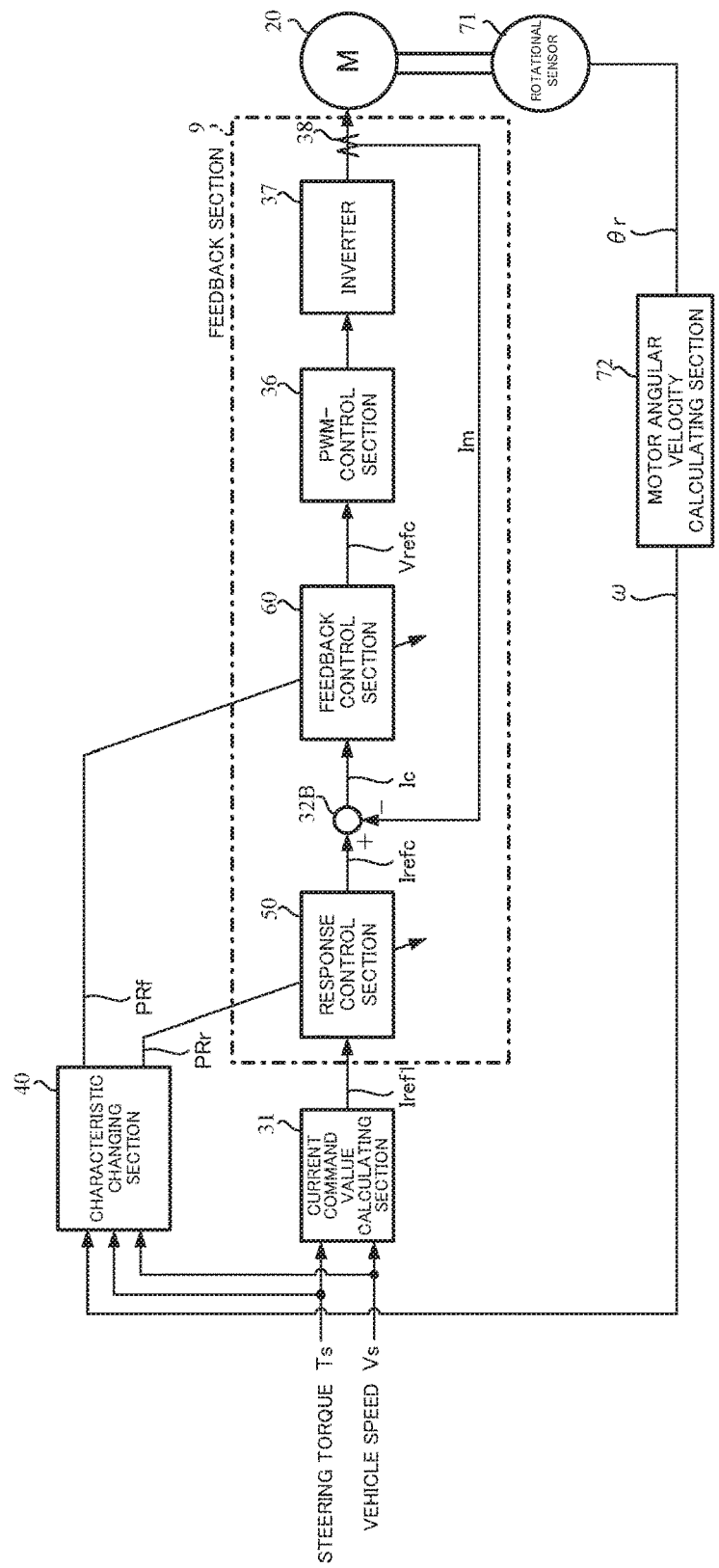
FIG. 3 is a block diagram showing a configuration example (a first embodiment) of the present invention.

FIG. 3 shows a configuration example (a first embodiment) of an embodiment of the present invention corresponding to FIG. 2, the same configurations are designated with the same numerals, and the explanation is omitted.

Figure 1:
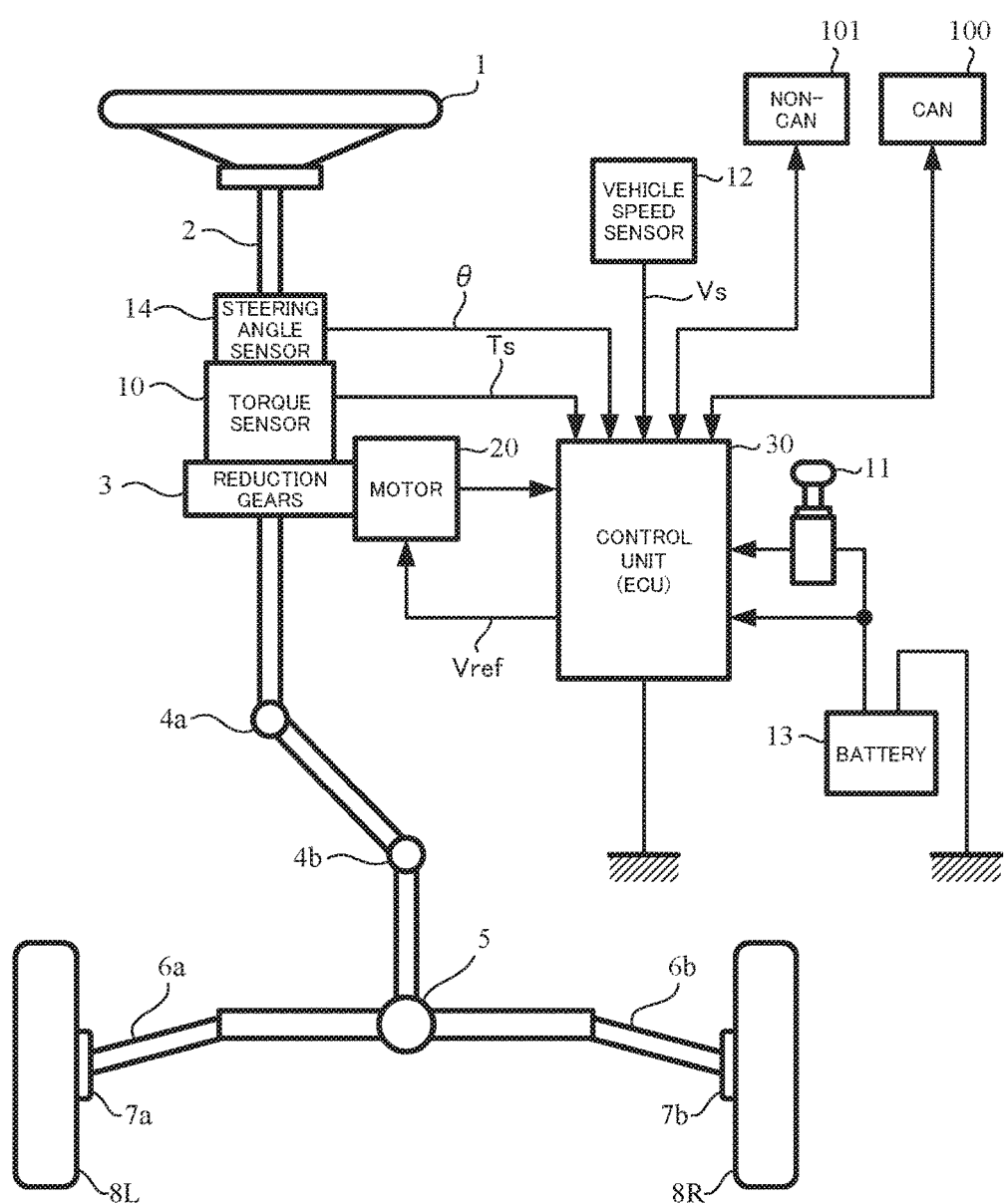
FIG. 1 is a configuration diagram illustrating a general outline of an electric power steering apparatus.

In the present configuration example, a feedback control section 60 is provided instead of a PI-control section in a feedback mechanism, a response control section 50 is interposed between a current command value calculating section 31 and the feedback mechanism, and a characteristic changing section 40 that sets coefficients of respective transfer functions of the feedback control section 60 and the response control section 50, is added. Further, the present configuration example uses a motor angular velocity, a steering torque and a vehicle speed as the control unit state, and a rotation sensor 71 that detects a rotational angle θr of a motor and a motor angular velocity calculating section 72 that calculates a motor angular velocity ω from the rotational angle θr, are added in order to calculate the motor angular velocity. The rotation sensor 71, and a torque sensor 10 for detecting the steering torque and a vehicle speed sensor 12 for detecting the vehicle speed that are shown in FIG. 1, function as a control unit state detecting section. A feedback section 9 is constituted of the response control section 50, the feedback control section 60, a PWM-control section 36, an inverter 37 and a motor current detector 38.

The characteristic changing section 40 inputs the motor angular velocity ω, a steering torque Ts and a vehicle speed Vs as the control unit state, and calculates coefficients of a transfer function $C_1(s)$ (s is a Laplace operator) of the response control section 50 and coefficients of a transfer function $C_2(s)$ of the feedback control section 60.

Figure 4:
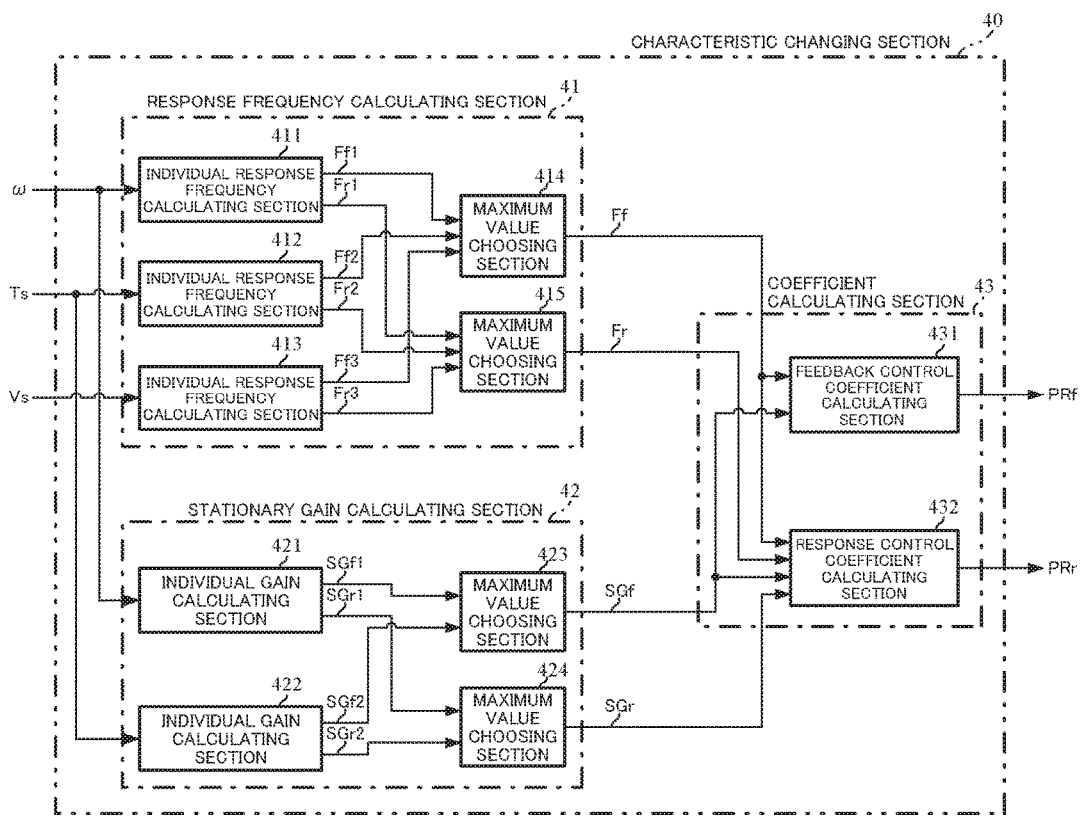
FIG. 4 is a block diagram showing a configuration example of a characteristic changing section of the first embodiment.

A configuration example of the characteristic changing section 40 is shown in FIG. 4. The characteristic changing section 40 comprises a response frequency calculating section 41, a stationary gain calculating section 42 and a coefficient calculating section 43. The response frequency calculating section 41 inputs the motor angular velocity ω, the steering torque Ts and the vehicle speed Vs as the control unit state, and calculates a response frequency (a command value response frequency) Fr of the command value response characteristic and a response frequency (a closed loop response frequency) Ff of the closed loop response characteristic. The stationary gain calculating section 42 inputs the motor angular velocity ω and the steering torque Ts as the control unit state, and calculates a stationary gain (a command value response stationary gain) SGr of the command value response characteristic and a stationary gain (a closed loop response stationary gain) SGf of the closed loop response characteristic. The coefficient calculating section 43 calculates the coefficients of the transfer function $C_1(s)$ of the response control section 50 and the coefficients of the transfer function $C_2(s)$ of the feedback control section 60 by using the command value response frequency Fr, the closed loop response frequency Ff, the command value response stationary gain SGr and the closed loop response stationary gain SGf.

As shown in FIG. 4, the response frequency calculating section 41 comprises individual response frequency calculating sections 411, 412 and 413 whose number is equal to the number of the control unit states inputted into the response frequency calculating section 41, and maximum value choosing sections 414 and 415 that choose and determine the closed loop response frequency Ff and the command value response frequency Fr respectively. The individual response frequency calculating section 411 inputs the motor angular velocity ω, the individual response frequency calculating section 412 inputs the steering torque Ts, the individual response frequency calculating section 413 inputs the vehicle speed Vs, and each of them calculates a closed loop response frequency (hereinafter referred to a "closed loop individual response frequency") and a command value response frequency (hereinafter referred to a "command value individual response frequency") for inputted each control unit state by using a map (hereinafter referred to an "individual response frequency map"). Both the closed loop individual response frequency and the command value individual response frequency are referred to an individual response frequency in a lump. The maximum value choosing section 414 outputs a maximum value among the closed loop individual response frequencies calculated in the individual response frequency calculating sections 411, 412 and 413 as the closed loop response frequency Ff. The maximum value choosing section 415 outputs a maximum value among the command value individual response frequencies calculated in the individual response frequency calculating sections 411, 412 and 413 as the command value response frequency Fr.

Here, the individual response frequency map will be described.

Figure 5:
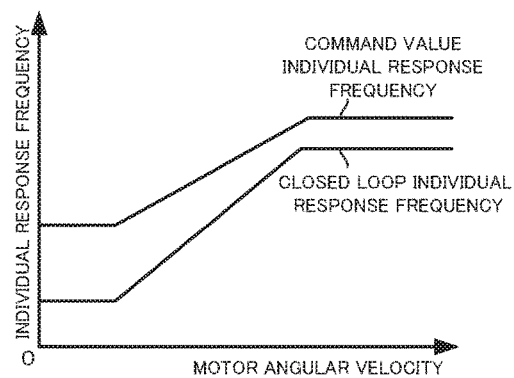
FIG. 5 is a characteristic diagram showing an example of an individual response frequency map according to a motor angular velocity.
Figure 6:
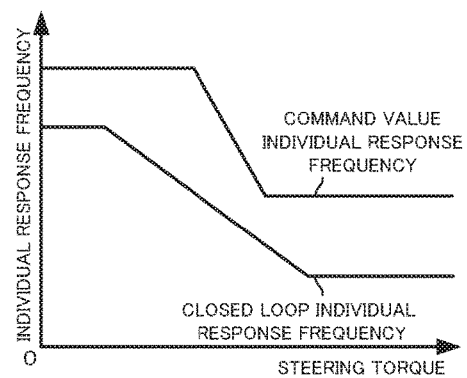
FIG. 6 is a characteristic diagram showing an example of an individual response frequency map according to a steering torque.
Figure 7:
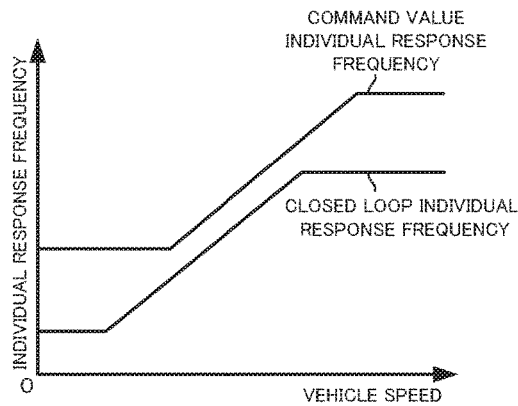
FIG. 7 is a characteristic diagram showing an example of an individual response frequency map according to a vehicle speed.

Examples of the individual response frequency maps for the motor angular velocity, the steering torque and the vehicle speed are shown in FIG. 5, FIG. 6 and FIG. 7 respectively.

As shown in FIG. 5 to FIG. 7, the individual response frequency map has two changing points where a ratio of a change of the individual response frequency to a change of the control unit state is sharply changed, the individual response frequency is a predetermined fixed value (hereinafter referred to a "first fixed value") when a value of the control unit state is less than or equal to the value (hereinafter referred to a "first boundary value") of the control unit state at the smaller of the changing points, and the individual response frequency is another predetermined fixed value (hereinafter referred to a "second fixed value") when a value of the control unit state is more than or equal to the value (hereinafter referred to a "second boundary value") of the control unit state at the other changing point. The individual response frequency is a value obtained by linear interpolation of the two changing points between the first boundary value and the second boundary value. The number of the changing points may be more than or equal to three, and the interpolation between the changing points may not be the linear interpolation, but may be an interpolation by a curve of the second or higher order, etc.

Next, examples of the individual response frequency maps for respective control unit states will be described.

At first, an example of the individual response frequency map according to the motor angular velocity will be described. When the motor angular velocity is low, a driver is sensitive to a vibration from such as a detection noise included in the steering torque obtained from the sensor and the detected motor current value. However, when the motor angular velocity is high, the driver pays attention to steering for emergency avoidance, a parking operation or the like and external environment, so that there is a tendency that such a vibration as described above is hard to be conscious of.

Therefore, as shown in FIG. 5, the individual response frequency is set small in steering at a low velocity, and is set large in steering at a high velocity.

With respect to the steering torque, the larger the steering torque becomes, the lower an effect of a mechanism to reduce and absorb a vibration, such as a rubber bush and a gap between gears that are provided in the EPS, becomes, and rigidity of the whole EPS increases. For this reason, a vibration that lies concealed at normal time becomes transmitted easily. Therefore, as shown in FIG. 6, the larger the steering torque becomes, the smaller the individual response frequency is set.

With respect to the vehicle speed, when the vehicle speed is low, the driver tends to be sensitive to the above vibration from such as the detection noise, as with the motor angular velocity. However, as the vehicle speed becomes high, it is required that the vehicle reacts to and follows even minute steering without any delay, such a vibration as the above disappears into a road noise or the like, and becomes hard to feel. Therefore, as shown in FIG. 7, the individual response frequency is set small at a low vehicle speed, and is set large at a high vehicle speed.

As shown in FIG. 4, the stationary gain calculating section 42 comprises individual gain calculating sections 421 and 422 whose number is equal to the number of the control unit states inputted into the stationary gain calculating section 42, and maximum value choosing sections 423 and 424 that choose and determine the closed loop response stationary gain SGf and the command value response stationary gain SGr respectively. The individual gain calculating section 421 inputs the motor angular velocity ω, the individual gain calculating section 422 inputs the steering torque Ts, and each of them calculates a closed loop response stationary gain (hereinafter referred to a "closed loop individual gain") and a command value response stationary gain (hereinafter referred to a "command value individual gain") for inputted each control unit state by using a map (hereinafter referred to an "individual gain map"). Both the closed loop individual gain and the command value individual gain are referred to an individual gain in a lump. The maximum value choosing section 423 outputs a maximum value among the closed loop individual gains calculated in the individual gain calculating sections 421 and 422 as the closed loop response stationary gain SGf. The maximum value choosing section 424 outputs a maximum value among the command value individual gains calculated in the individual gain calculating sections 421 and 422 as the command value response stationary gain SGr.

Figure 8:
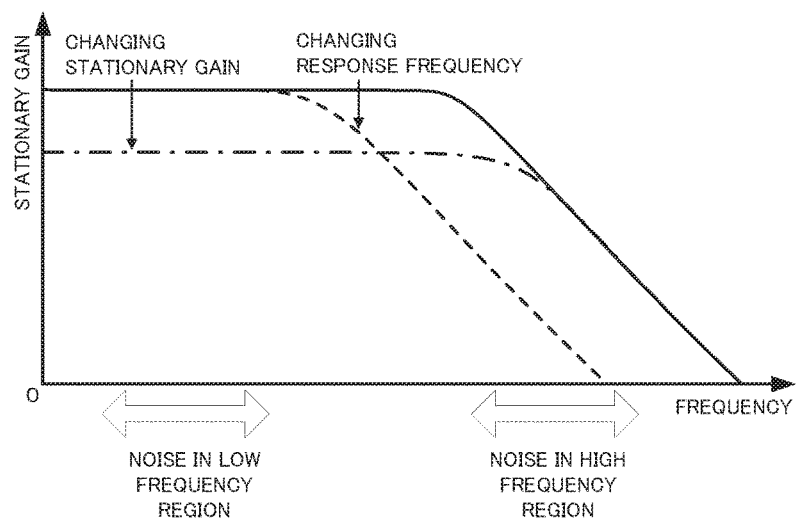
FIG. 8 is a characteristic diagram showing an example of a change of a response characteristic (an amplitude characteristic) by changing a response frequency and a gain.

The stationary gain calculating section 42 adjusts stationary gains of the command value response characteristic and the closed loop response characteristic. As described above, with respect to the noise immunity, the closed loop response characteristic being a feedback characteristic largely contributes to it, however, with respect to a noise included in a current command value and a disturbance (a disturbance d in FIG. 11) superimposed until an output from the control section is supplied to a motor, the command value response characteristic largely contributes to them. Since the command value response characteristic being a target value response characteristic largely contributes the responsibility as described above, the responsibility and the noise immunity are in the relation of trade-off with respect to these noises even using two-degree-of-freedom control. Further, there is the case where a noise included in a low frequency region is also difficult to suppress only by lowering the response frequencies of both characteristics (the closed loop response frequency and the command value response frequency). Accordingly, by lowering the stationary gains of both characteristics, the stationary gain calculating section 42 adjusts the responsibility of whole frequency region, and suppresses the vibrations caused by the above noises. That is, as shown in FIG. 8, with respect to a noise in a high frequency region, it is reduced by changing the response frequency like the characteristic shown by the dashed line, and with respect to a noise in a low frequency region, it is reduced by changing the stationary gain like the characteristic shown by the dashed dot line.

Here, the individual gain map will be described.

Figure 9:
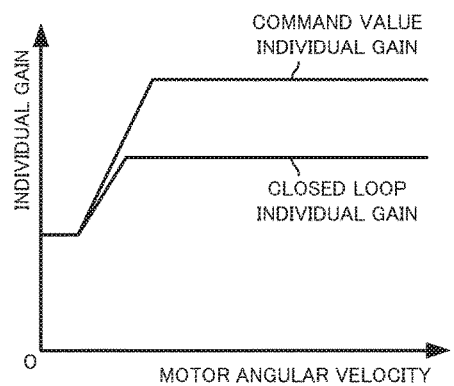
FIG. 9 is a characteristic diagram showing an example of an individual gain map according to the motor angular velocity.
Figure 10:
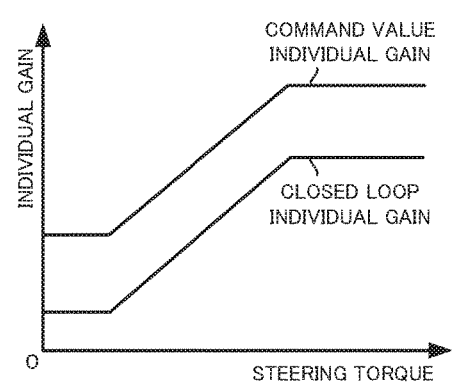
FIG. 10 is a characteristic diagram showing an example of an individual gain map according to the steering torque.

Examples of the individual gain maps for the motor angular velocity and the steering torque are shown in FIG. 9 and FIG. 10 respectively.

As shown in FIG. 9 to FIG. 10, the individual gain map, as with the individual response frequency map, has two changing points where a ratio of a change of the individual gain to a change of the control unit state is sharply changed, the individual gain is a predetermined fixed value (hereinafter referred to a "third fixed value") when a value of the control unit state is less than or equal to the value (hereinafter referred to a "third boundary value") of the control unit state at the smaller of the changing points, and the individual gain is another predetermined fixed value (hereinafter referred to a "fourth fixed value") when a value of the control unit state is more than or equal to the value (hereinafter referred to a "fourth boundary value") of the control unit state at the other changing point. The individual gain is a value obtained by linear interpolation of the two changing points between the third boundary value and the fourth boundary value. As with the individual response frequency map, the number of the changing points may be more than or equal to three, and the interpolation between the changing points may not be the linear interpolation, but may be an interpolation by a curve of the second or higher order, etc.

Next, examples of the individual gain maps for respective control unit states will be described.

At first, an example of the individual gain map according to the motor angular velocity will be described. With respect to the motor angular velocity, since there is a tendency that the driver is sensitive to the vibration caused by such as the noise included in the current command value in steering holding or steering at a minute velocity, the noise immunity is emphasized more than the responsibility. Therefore, as shown in FIG. 9, the individual gain is set small in the region where the motor angular velocity is low.

With respect to the steering torque, since the steering torque is obtained from the sensor, the detection noise is included in it. Therefore, as shown in FIG. 10, the individual gain is set small in the region where the steering torque is small and an influence of the detection noise becomes large.

The coefficient calculating section 43, as shown in FIG. 4, comprises a feedback control coefficient calculating section 431 that calculates the coefficients of the transfer function $C_2(s)$ of the feedback control section 60 by using the closed loop response frequency Ff and the closed loop response stationary gain SGf, and a response control coefficient calculating section 432 that calculates the coefficients of the transfer function $C_1(s)$ of the response control section 50 by using the command value response frequency Fr, the closed loop response frequency Ff, the command value response stationary gain SGr and the closed loop response stationary gain SGf.

Here, the calculation of the coefficients of the transfer function $C_2(s)$ of the feedback control section 60 and the coefficients of the transfer function $C_1(s)$ of the response control section 50 will be described.

At first, the calculation of the coefficients of the transfer function $C_2(s)$ of the feedback control section 60 will be described.

A transfer function (hereinafter referred to a "closed loop transfer function") $G_L(s)$ of the characteristic (the closed loop response characteristic) of the feedback mechanism including the feedback control section 60 is set with a first order transfer function as defined by the following expression 1.

$$G_L(s) = SGf \cdot \frac{1}{T_1 s + 1} \quad \text{[Expression 1]}$$

$T_1$ is a time constant, and is identical with the reciprocal of the closed loop response frequency Ff calculated by the response frequency calculating section 41, as defined by the following expression 2.

$$T_1 = \frac{1}{Ff} \quad \text{[Expression 2]}$$

The closed loop response stationary gain SGf is calculated by the stationary gain calculating section 42.

On the other hand, a transfer function $P_M(s)$ of the motor is shown by the following expression 3 in the case of defining an inductance as L and an internal resistance as R.

$$P_M(s) = \frac{1}{Ls + R} \quad \text{[Expression 3]}$$

In order to cancel the characteristic of the motor and to control the feedback mechanism by the closed loop response characteristic, the transfer function $C_2(s)$ of the feedback control section 60 is set as the following expression 4.

$$C_2(s) = \frac{1}{w_1 s + w_0} \cdot P_M^{-1}(s) = \frac{Ls + R}{w_1 s + w_0} \quad \text{[Expression 4]}$$

Figure 11:
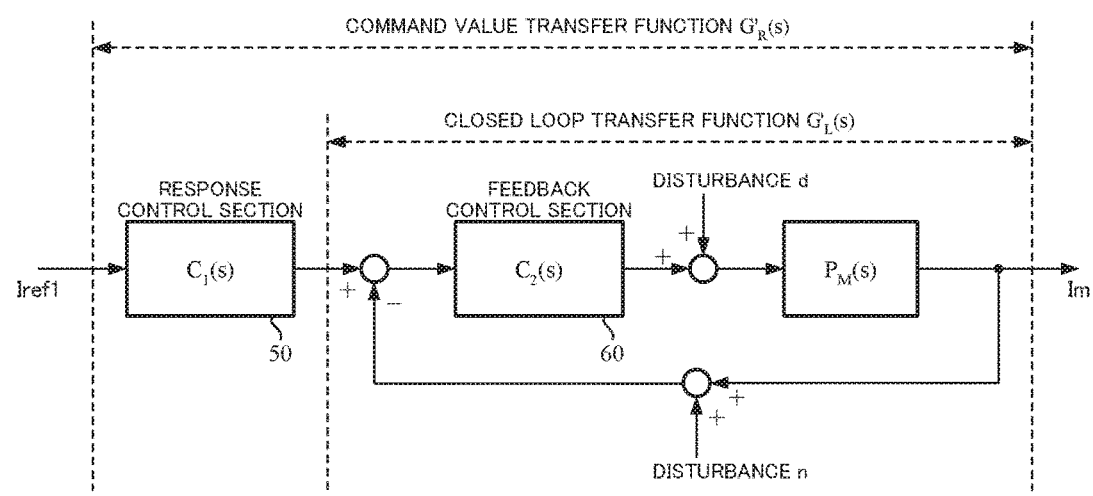
FIG. 11 is a block diagram showing a transfer function of the first embodiment.

As shown in FIG. 11, a closed loop transfer function $G'_L(s)$ derived from the transfer function $C_2(s)$ of the feedback control section 60 and the transfer function $P_M(s)$ of the motor, is shown by the following expression 5.

$$G'_L(s) = \frac{C_2(s) P_M(s)}{1 + C_2(s) P_M(s)} \quad \text{[Expression 5]}$$

Therefore, the following expression 6 is derived by setting $G_L(s) = G'_L(s)$ and calculating coefficients $w_0$ and $w_1$ of the transfer function $C_2(s)$.

$$w_0 = \frac{1}{SGf} - 1 \quad \text{[Expression 6]}$$
$$w_1 = \frac{T_1}{SGf} = \frac{1}{Ff \cdot SGf}$$

In the case of presetting the inductance L and the internal resistance R, it is possible to set the transfer function $C_2(s)$ of the feedback control section 60 in accordance with the expression 6 by using the closed loop response frequency Ff and the closed loop response stationary gain SGf.

Meanwhile, a transfer function $C_{PI}(s)$ of general PI control can be shown by the following expression 7.

$$C_{PI}(s) = K_p \left( \frac{T_I s + 1}{T_I s} \right) \qquad \text{[Expression 7]}$$

Thus, from the fact that the degrees of the numerator and the denominator of the transfer function $C_{PI}(s)$ are identical with ones of the transfer function $C_2(s)$ respectively, it is shown that the feedback control section where the closed loop transfer function is defined as one degree is configured in the manner of configuring a control section having a characteristic similar to the PI control by the closed loop response frequency. Further, the following expression 8 is derived by obtaining the closed loop transfer function in accordance with the transfer function $C_{PI}(s)$.

$$\begin{aligned} G_{PI}(s) &= \frac{C_{PI}(s)P_M(s)}{1 + C_{PI}(s)P_M(s)} \qquad \text{[Expression 8]}\\ &= \frac{K_p(T_I s + 1)}{K_p(T_I s + 1) + T_I(Ls^2 + Rs)}\\ &= \frac{K_p(T_I s + 1)}{T_I L s^2 + (K_p + R)T_I s + K_p} \end{aligned}$$

When configuring the control section in accordance with the expression 8 by using the PI control, it is difficult to presume a closed loop response frequency being set by using $K_P$ and $T_I$ because the $K_P$ and the $T_I$ are involved complicatedly. Further, the inductance L and the internal resistance R are also included in the closed loop transfer function, and the characteristic of the motor also affects the closed loop response frequency, so that reconfiguration of the control section is necessary every time the characteristic of the motor is changed in order to keep a closed loop frequency characteristic constant. In the present configuration example, since the closed loop transfer function is set from the closed loop response frequency and the closed loop response stationary gain as shown in the expression 1 and the expression 2, the above problem is solved.

The feedback control coefficient calculating section 431 outputs the coefficients $w_0$ and $w_1$ as a control coefficient PRf.

Next, the calculation of the coefficients of the transfer function $C_1(s)$ of the response control section 50 will be described.

A transfer function (hereinafter referred to a "command value transfer function") $G_R(s)$ of the characteristic (the command value response characteristic) from the command value to the motor current value is set with a first order transfer function as defined by the following expression 9.

$$G_R(s) = SGr \cdot \frac{1}{T_2 s + 1} \qquad \text{[Expression 9]}$$

$T_2$ is a time constant, and is identical with the reciprocal of the command value response frequency Fr calculated by the response frequency calculating section 41, as defined by the following expression 10.

$$T_2 = \frac{1}{Fr} \qquad \text{[Expression 10]}$$

The command value response stationary gain SGr is calculated by the stationary gain calculating section 42.

On the other hand, as shown in FIG. 11, a command value transfer function $G'_R(s)$ derived from the transfer function $C_1(s)$ of the response control section 50 and the closed loop transfer function $G_L(s)(=G'_L(s))$, is shown by the following expression 11.

$$G'_R(s) = C_1(s)G_L(s) \qquad \text{[Expression 11]}$$

In order to eliminate the closed loop response characteristic and control a command value response by the command value response characteristic, the transfer function $C_1(s)$ is set by setting $G_R(s) = G'_R(s)$ as defined by the following expression 12.

$$C_1(s) = \frac{SGr}{SGf} \cdot \frac{T_1 s + 1}{T_2 s + 1} \qquad \text{[Expression 12]}$$

Therefore, in accordance with the expression 12, it is possible to set the transfer function $C_1(s)$ of the response control section 50 by using the command value response frequency Fr $(=1/T_2)$, the closed loop response frequency Ff $(=1/T_1)$, the command value response stationary gain SGr and the closed loop response stationary gain SGf.

The response control coefficient calculating section 432 outputs the $T_1$, the $T_2$ and SGr/SGf as a control coefficient PRr.

The response control section 50 calculates a control current command value Irefc from a current command value Iref1 by using the transfer function $C_1(s)$ that is set on the basis of the control coefficient PRr outputted from the characteristic changing section 40.

The feedback control section 60 calculates a voltage control command value Vrefc from a deviation Ic (=Irefc−Im) between the control current command value Irefc and a motor current value Im being fed back by using the transfer function $C_2(s)$ that is set on the basis of the control coefficient PRf outputted from the characteristic changing section 40.

Figure 12:
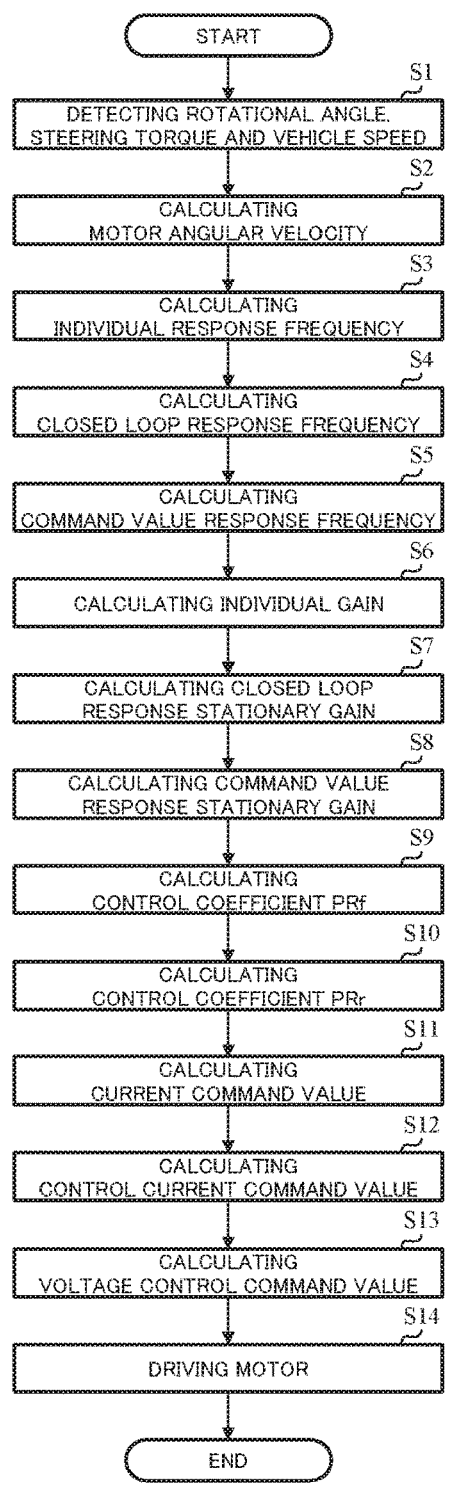
FIG. 12 is a flowchart showing an operating example (the first embodiment) of the present invention.

In such a configuration, an operating example will be described with reference to a flowchart shown in FIG. 12.

As the operation starts, the rotation sensor 71, the torque sensor 10 and the vehicle speed sensor 12 detect the rotational angle θr of the motor 20, the steering torque Ts and the vehicle speed Vs respectively (Step S1). The rotational angle θr is inputted into the motor angular velocity calculating section 72, and the motor angular velocity calculating section 72 calculates the motor angular velocity ω by differentiating the rotational angle θr (Step S2).

The steering torque Ts and the vehicle speed Vs are inputted into the current command value calculating section 31 and the characteristic changing section 40, and the motor angular velocity ω is inputted into the characteristic changing section 40.

In the characteristic changing section 40, the motor angular velocity ω is inputted into the individual response frequency calculating section 411 of the response frequency calculating section 41 and the individual gain calculating section 421 of the stationary gain calculating section 42, the steering torque Ts is inputted into the individual response frequency calculating section 412 of the response frequency calculating section 41 and the individual gain calculating section 422 of the stationary gain calculating section 42, and the vehicle speed Vs is inputted into the individual response frequency calculating section 413 of the response frequency calculating section 41.

The individual response frequency calculating section 411 calculates a closed loop individual response frequency Ff1 and a command value individual response frequency Fr1 by using the individual response frequency map shown in FIG. 5. Similarly, the individual response frequency calculating sections 412 and 413 also calculate a closed loop individual response frequency Ff2 and a command value individual response frequency Fr2, and a closed loop individual response frequency Ff3 and a command value individual response frequency Fr3 respectively by using the individual response frequency maps shown in FIG. 6 and FIG. 7 (Step S3).

The closed loop individual response frequencies Ff1, Ff2 and Ff3 are inputted into the maximum value choosing section 414 of the response frequency calculating section 41, and the maximum value choosing section 414 calculates the maximum value among the closed loop individual response frequencies Ff1, Ff2 and Ff3 as the closed loop response frequency Ff (Step S4).

Similarly, the command value individual response frequencies Fr1, Fr2 and Fr3 are inputted into the maximum value choosing section 415 of the response frequency calculating section 41, and the maximum value choosing section 415 calculates the maximum value among the command value individual response frequencies Fr1, Fr2 and Fr3 as the command value response frequency Fr (Step S5).

The individual gain calculating section 421 calculates a closed loop individual gain SGf1 and a command value individual gain SGr1 by using the individual gain map shown in FIG. 9. Similarly, the individual gain calculating section 422 calculates a closed loop individual gain SGf2 and a command value individual gain SGr2 by using the individual gain map shown in FIG. 10 (Step S6).

The closed loop individual gains SGf1 and SGf2 are inputted into the maximum value choosing section 423 of the stationary gain calculating section 42, and the maximum value choosing section 423 calculates the maximum value between the closed loop individual gains SGf1 and SGf2 as the closed loop response stationary gain SGf (Step S7).

Similarly, the command value individual gains SGr1 and SGr2 are inputted into the maximum value choosing section 424 of the stationary gain calculating section 42, and the maximum value choosing section 424 calculates the maximum value between the command value individual gains SGr1 and SGr2 as the command value response stationary gain SGr (Step S8).

The closed loop response frequency Ff and the closed loop response stationary gain SGf are inputted into the feedback control coefficient calculating section 431 and the response control coefficient calculating section 432 in the coefficient calculating section 43. The command value response frequency Fr and the command value response stationary gain SGr are inputted into the response control coefficient calculating section 432 in the coefficient calculating section 43.

The feedback control coefficient calculating section 431 calculates the coefficients $w_0$ and $w_1$ in accordance with the expression 6 by using the closed loop response frequency Ff and the closed loop response stationary gain SGf, and outputs them as the control coefficient PRf (Step S9).

The response control coefficient calculating section 432 calculates the time constants $T_1$ and $T_2$ in accordance with the expressions 2 and 10 by using the closed loop response frequency Ff, the closed loop response stationary gain SGf, the command value response frequency Fr and the command value response stationary gain SGr, and outputs them with the calculation result of SGr/SGf as the control coefficient PRr (Step S10).

The current command value calculating section 31 inputting the steering torque Ts and the vehicle speed Vs calculates the current command value Iref1, and outputs it to the response control section 50 (Step S11).

The response control section 50 sets the transfer function $C_1(s)$ of the expression 12 by using the control coefficient PRr outputted from the response control coefficient calculating section 432, and calculates the control current command value Irefc from the current command value Iref1 by using the set transfer function $C_1(s)$ (Step S12).

The control current command value Irefc is inputted into a subtracting section 32B, where the deviation Ic between the control current command value Irefc and the motor current value Im that is detected by the motor current detector 38 and is fed back, is calculated, and the deviation Ic is inputted into the feedback control section 60.

The feedback control section 60 sets the transfer function $C_2(s)$ of the expression 4 by using the control coefficient PRf outputted from the feedback control coefficient calculating section 431, and the inductance L and the internal resistance R that are preset, and calculates the voltage control command value Vrefc from the deviation Ic by using the set transfer function $C_2(s)$ (Step S13).

The voltage control command value Vrefc is inputted into the PWM-control section 36, and the motor 20 is PWM-driven through the inverter 37 (Step S14).

Figure 13:
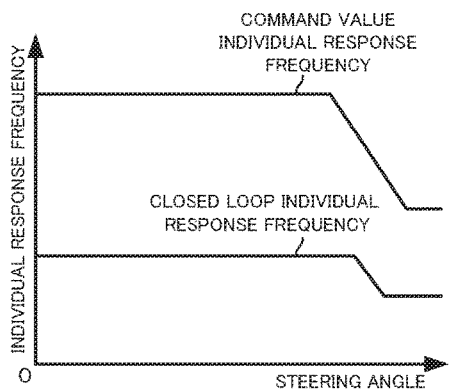
FIG. 13 is a characteristic diagram showing an example of an individual response frequency map according to a steering angle.
Figure 14:
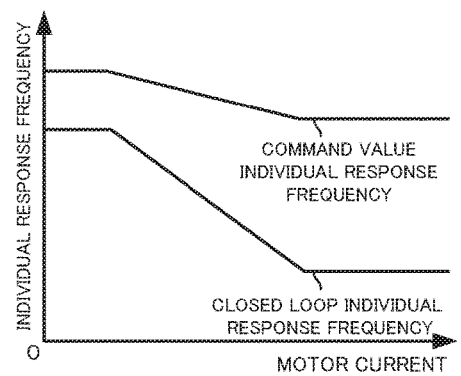
FIG. 14 is a characteristic diagram showing an example of an individual response frequency map according to a motor current.
Figure 15:
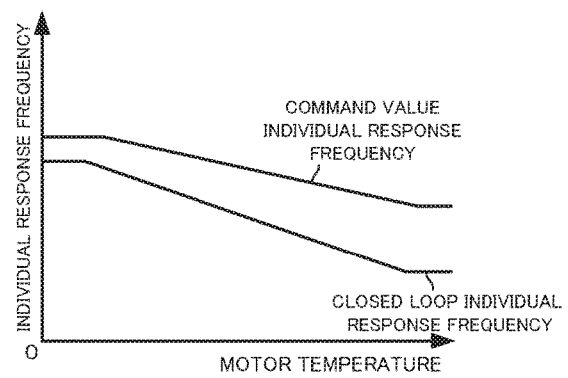
FIG. 15 is a characteristic diagram showing an example of an individual response frequency map according to a motor temperature.

Moreover, though the first embodiment uses the motor angular velocity, the steering torque and the vehicle speed in calculating the response frequencies (the closed loop response frequency and the command value response frequency) and uses the motor angular velocity and the steering torque in calculating the stationary gains (the closed loop response stationary gain and the command value response stationary gain), it may use also the vehicle speed in calculating the stationary gains, furthermore, may use control unit states other than these, such as a steering angle, a motor current, a motor temperature, a current command value, a motor angular acceleration and a steering angular velocity, which can be obtained by a sensor and an estimation means, in calculating the response frequencies and the stationary gains. Examples of individual response frequency maps for the steering angle, the motor current and the motor temperature are shown in FIG. 13 to FIG. 15 respectively.

The example of the individual response frequency map according to the steering angle will be described. The EPS can be equipped with a rack end protection function that performs correction of gradually reducing an assist amount in the vicinity of a rack end in order to protect the rack end and improve heat resistance. This function causes that an output is easy to suddenly change in the vicinity of the rack end, so that a problem of a vibration different from at normal time can occur. To deal with this, as shown in FIG. 13, it is possible to make the vibration hard to occur by lowering the individual response frequency in the vicinity of the rack end.

With respect to the motor current, as with the steering torque, the larger the motor current becomes, the lower the effect of the mechanism to reduce and absorb the vibration, such as the rubber bush and the gap between gears that are provided in the EPS, becomes, and the rigidity of the whole EPS increases, so that the vibration that lies concealed at normal time becomes transmitted easily. Therefore, as shown in FIG. 14, the larger the motor current becomes, the smaller the individual response frequency is set.

With respect to the motor temperature, basically, since the feedback control section is configured so as to cancel the characteristic of the motor, the closed loop response characteristic is not affected by the characteristic of the motor. However, since an internal resistance and an inductance of the motor change in accordance with the motor temperature, an error can occur even if the set internal resistance and the set inductance are adjusted in advance supposing the motor temperature. In this case, since the responsibility decreases, the farther the motor temperature is from a reference temperature used in adjusting a motor model, that is, the lower the motor temperature becomes, the larger the individual response frequency is made, as shown in FIG. 15. This enables a response to a model error.

In an individual response frequency map according to the current command value, as with the motor current, the larger the current command value becomes, the smaller the individual response frequency is set.

In each of individual response frequency maps for the motor angular acceleration and the steering angular velocity, as with the motor angular velocity, the individual response frequency is set small when each of the motor angular acceleration and the steering angular velocity is small, and the individual response frequency is set large when that is large.

Though the degree of the closed loop transfer function, the command value transfer function or the like is one in the first embodiment, it is not limited to one, that is, an arbitrary degree more than or equal to two is possible. Further, in configuring the characteristic changing section, division and integration of components may be performed. For example, it is possible to divide the individual response frequency calculating section and the individual gain calculating section into a section for calculation with respect to the closed loop response characteristic and a section for calculation with respect to the command value response characteristic respectively.

Next, a second embodiment of the present invention will be described.

With respect to the response frequency calculated by a response frequency calculating section and the stationary gain calculated by a stationary gain calculating section in a characteristic changing section, the second embodiment limits a change amount from the previous value of each of them. Though the response frequency and the stationary gain can be flexibly changed in accordance with each control unit state, there is a possibility that the response frequency and the stationary gain suddenly change or vibrate by sudden change of a noise included in a signal of each control unit state or the signal. Since this causes occurrence of new sound or new vibration, the change amounts of the response frequency and the stationary gain are limited to a fixed amount or less so as to suppress the occurrence of sound and vibration.

Figure 16:
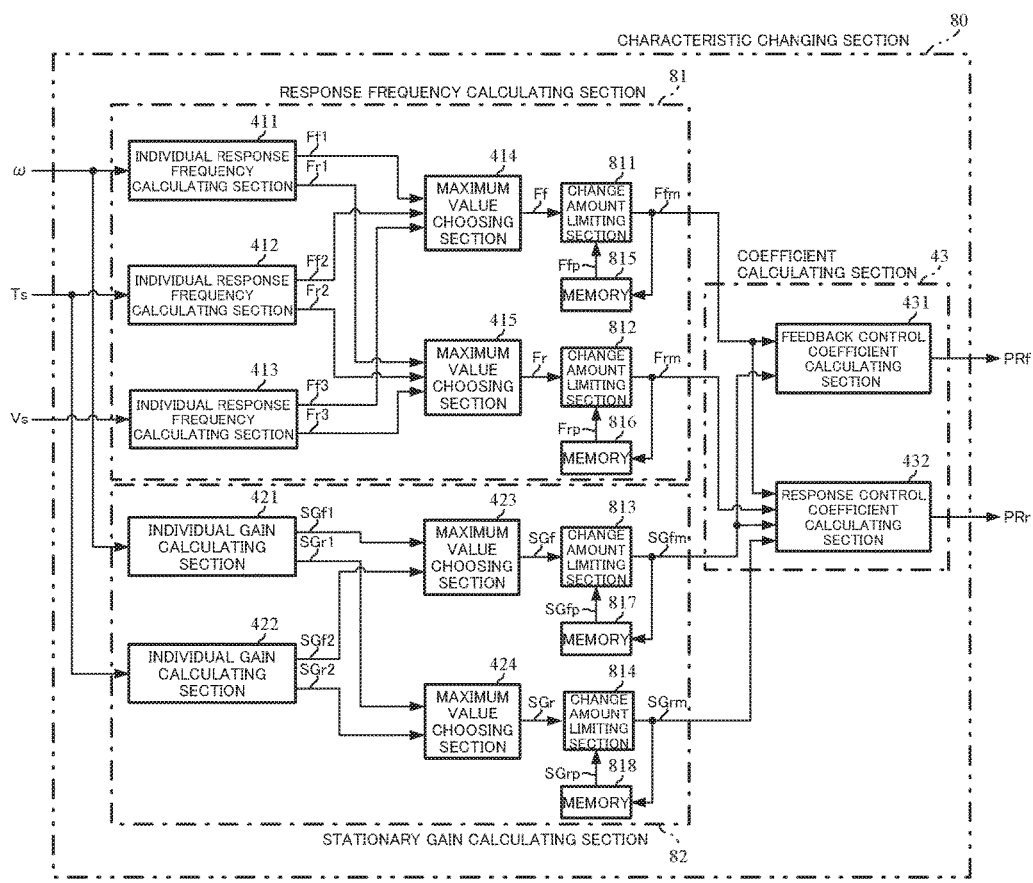
FIG. 16 is a block diagram showing a configuration example of a characteristic changing section in a configuration example (a second embodiment) of the present invention.

FIG. 16 shows a configuration example of the characteristic changing section of the second embodiment corresponding to the characteristic changing section of the first embodiment shown in FIG. 4, the same configurations are designated with the same numerals, and the explanation is omitted. Other components of the second embodiment are the same as ones of the first embodiment.

In order to limit change amount from each previous value of the closed loop response frequency, the command value response frequency, the closed loop response stationary gain and the command value response stationary gain (hereinafter referred to a "choice data" in a lump) that are calculated in the maximum value choosing sections 414, 415, 423 and 424 respectively, the present configuration example is provided with memories 815, 816, 817 and 818 that store the previous choice data, and change amount limiting sections 811, 812, 813 and 814 each of which compares the choice data calculated in the maximum value choosing section with the previous choice data stored in the memory and adjusts the choice data so that a change amount (an amplitude of a difference) does not become larger than a predetermined value (hereinafter referred to a "limit value").

The change amount limiting sections 811, 812, 813 and 814 have limit values CFf, CFr, CSGf and CSGr respectively. When the absolute value of the difference between the choice data outputted from the maximum value choosing section and the previous choice data stored in the memory is larger than the limit value, the change amount limiting section performs addition or subtraction to the choice data so that the absolute value of the difference becomes the limit value. When the absolute value of the difference is smaller than or equal to the limit value, the change amount limiting section outputs the choice data outputted from the maximum value choosing section as it is.

In such a configuration, an operating example of the change amount limiting section 811 will be described.

The closed loop response frequency Ff outputted from the maximum value choosing section 414 is inputted into the change amount limiting section 811.

The change amount limiting section 811 calculates a difference ΔFf (=Ff−Ffp) between a previous closed loop response frequency Ffp stored in the memory 815 and the closed loop response frequency Ff outputted from the maximum value choosing section 414. When the absolute value of the ΔFf is larger than the limit value CFf, the change amount limiting section 811 calculates a closed loop response frequency Ffm in accordance with the following expression 13.

$$Ffm = Ffp + \text{sign}(\Delta Ff) \times CFf \qquad \text{[Expression 13]}$$

When the absolute value of the ΔFf is smaller than or equal to the limit value CFf, the closed loop response frequency Ff becomes the closed loop response frequency Ffm.

The closed loop response frequency Ffm is outputted to the feedback control coefficient calculating section 431, and at the same time, is stored in the memory 815. The closed loop response frequency Ffm stored in the memory 815 is used for next calculation of the difference.

The change amount limiting sections 812, 813 and 814 calculate and output a command value response frequency Frm, a closed loop response stationary gain SGfm and a command value response stationary gain SGrm respectively by the same operation as the change amount limiting sections 811.

Moreover, it is possible not to use the amplitude of the difference as the change amount, but to use a ratio of the difference and so on. For example, when the ratio of the difference to the previous value is larger than a predetermined value, the change amount limiting section adjusts the choice data so that the ratio of the difference becomes the predetermined value.

Next, a third embodiment of the present invention will be described.

In the first embodiment, the maximum value among the individual response frequencies is the response frequency (the closed loop response frequency, the command value response frequency), and the maximum value among the individual gains is the stationary gain (the closed loop response stationary gain, the command value response stationary gain). In the third embodiment, a priority (a set priority) is assigned to each control unit state, and values obtained by weighting the individual response frequency and the individual gain with the priority become the response frequency and the stationary gain respectively.

Figure 17:
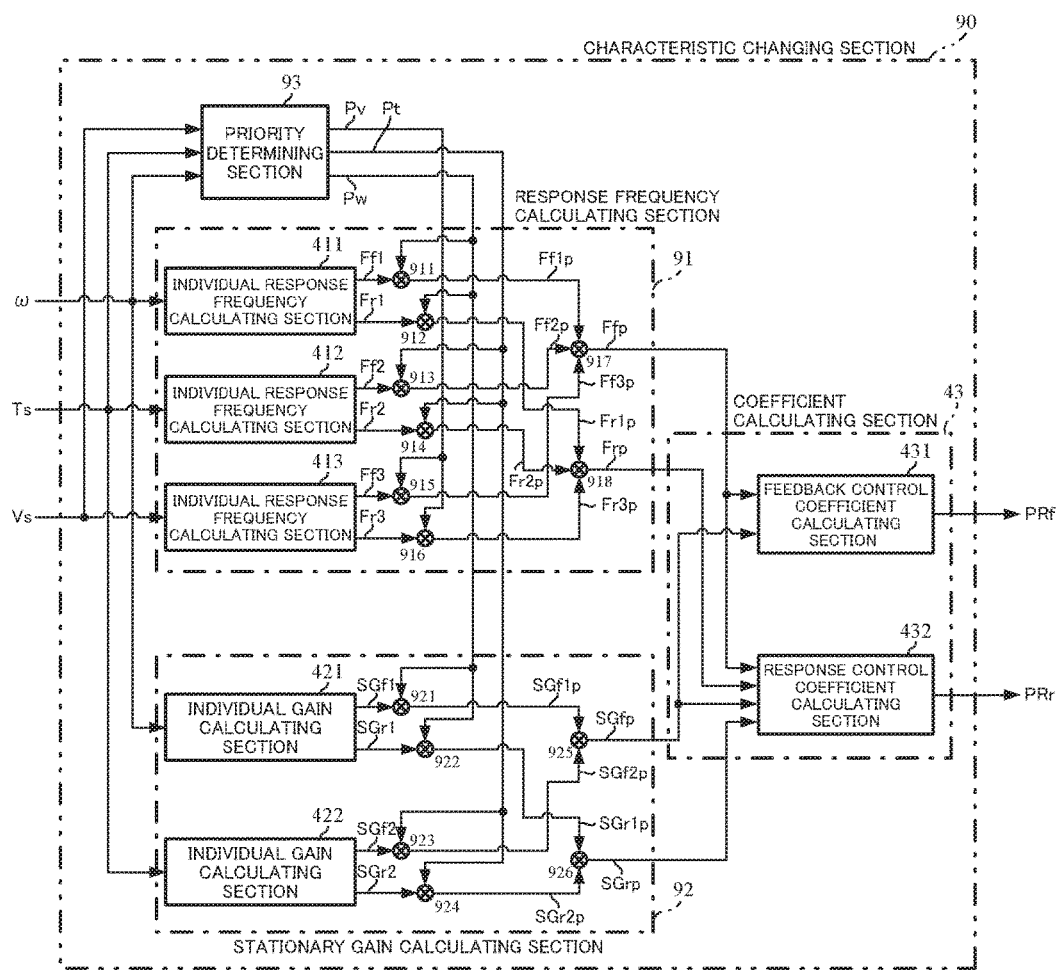
FIG. 17 is a block diagram showing a configuration example of a characteristic changing section in a configuration example (a third embodiment) of the present invention.

FIG. 17 shows a configuration example of a characteristic changing section of the third embodiment corresponding to the characteristic changing section of the first embodiment shown in FIG. 4, the same configurations are designated with the same numerals, and the explanation is omitted. Other components of the third embodiment are the same as ones of the first embodiment.

In the present configuration example, a priority determining section 93 that determines the priority of each control unit state is added, the maximum value choosing sections provided for the response frequency calculating section and the stationary gain calculating section are removed, and multipliers 911 to 916 and 921 to 924 that weight the individual response frequency and the individual gain with the priorities and multipliers 917, 918, 925 and 926 for calculating the response frequency and the stationary gain by means of the weighted individual response frequencies and the weighted individual gains, are provided instead.

The priority determining section 93 determines the priorities of respective control unit states (the motor angular velocity ω, the steering torque Ts and the vehicle speed Vs in the present configuration example). The priority may be preset to each control unit state, or may be variable depending on the value of the inputted control unit state, etc.

Figure 18:
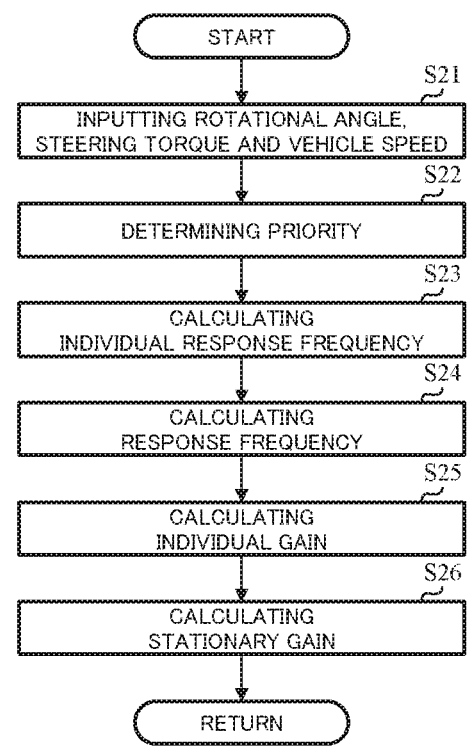
FIG. 18 is a flowchart showing an operating example (the third embodiment) of the present invention.

In such a configuration, operating example of the priority determining section 93, the response frequency calculating section 91 and the stationary gain calculating section 92 will be described with reference to a flowchart shown in FIG. 18.

The motor angular velocity ω, the steering torque Ts and the vehicle speed Vs that have been inputted into the characteristic changing section 90, are inputted into the priority determining section 93, at the same time, as with the first embodiment, the motor angular velocity ω is inputted into the individual response frequency calculating section 411 of a response frequency calculating section 91 and the individual gain calculating section 421 of a stationary gain calculating section 92, the steering torque Ts is inputted into the individual response frequency calculating section 412 of the response frequency calculating section 91 and the individual gain calculating section 422 of the stationary gain calculating section 92, and the vehicle speed Vs is inputted into the individual response frequency calculating section 413 of the response frequency calculating section 91 (Step S21).

The priority determining section 93 determines and outputs a priority Pw for the motor angular velocity ω, a priority Pt for the steering torque Ts and a priority Pv for the vehicle speed Vs (Step S22).

The individual response frequency calculating section 411 calculates the closed loop individual response frequency Ff1 and the command value individual response frequency Fr1 by the same operation as the first embodiment, and outputs them to the multipliers 911 and 912 respectively. In the multiplier 911, the closed loop individual response frequency Ff1 is multiplied by the priority Pw, and the multiplication result is outputted as a closed loop individual response frequency Ff1p. In the multiplier 912, the command value individual response frequency Fr1 is multiplied by the priority Pw, and the multiplication result is outputted as a command value individual response frequency Fr1p.

The individual response frequency calculating sections 412 and 413 also perform the same operation as the first embodiment, further, in the multipliers 913 to 916, the outputs from the individual response frequency calculating sections 412 and 413 are multiplied by the priorities for respective control unit states, and closed loop individual response frequencies Ff2p and Ff3p and command value individual response frequencies Fr2p and Fr3p are outputted (Step S23).

The closed loop individual response frequencies Ff1p, Ff2p and Ff3p are inputted into the multiplier 917, and the multiplication result is outputted as a closed loop response frequency Ffp. The command value individual response frequencies Fr1p, Fr2p and Fr3p are inputted into the multiplier 918, and the multiplication result is outputted as a command value response frequency Frp (Step S24).

The individual gain calculating section 421 calculates the closed loop individual gain SGf1 and the command value individual gain SGr1 by the same operation as the first embodiment, and outputs them to the multipliers 921 and 922 respectively. In the multiplier 921, the closed loop individual gain SGf1 is multiplied by the priority Pw, and the multiplication result is outputted as a closed loop individual gain SGf1p. In the multiplier 922, the command value individual gain SGr1 is multiplied by the priority Pw, and the multiplication result is outputted as a command value individual gain SGr1p.

The individual gain calculating section 422 also performs the same operation as the first embodiment, further, in the multipliers 923 and 924, the outputs from the individual gain calculating section 422 are multiplied by the priority Pt respectively, and a closed loop individual gain SGf2p and a command value individual gain SGr2p are outputted (Step S25).

The closed loop individual gains SGf1p and SGf2p are inputted into the multiplier 925, and the multiplication result is outputted as a closed loop response stationary gain SGfp. The command value individual gains SGr1p and SGr2p are inputted into the multiplier 926, and the multiplication result is outputted as a command value response stationary gain SGrp (Step S26).

Thus, it is possible to finely reflect the state of the control unit in the response frequency and the stationary gain by calculating the response frequency and the stationary gain with the priority to each control unit state.

Moreover, in order to enable finer adjustment, with respect to the priority assigned to each control unit state, the priority for the individual response frequency and the priority for the individual gain may not be the same, but may be different, and the priority for the closed loop response characteristic and the priority for the command value response characteristic may be different.

Further, in the third embodiment, it is possible to add the change amount limiting section added in the second embodiment and limit the change amount from the previous value.

Though the above embodiments (the first embodiment to the third embodiment) arrange the response control section and the feedback control section at the positions shown in FIG. 3, the arrangement of the control sections is not limited to this, and the control sections may be arranged at arbitrary positions if it is possible to form the command value response characteristic and the closed loop response characteristic. For example, it is possible to use various configurations proposed as a two-degree-of-freedom control system.

Further, in calculating the response frequency and the stationary gain from the individual response frequency and the individual gain, it is possible to use a method other than the method using the maximum value or the priority. For example, it is possible not to use the maximum value, but to use a minimum value or a mean value, and it is possible to combine the maximum value and the priority and use the maximum values of the weighted individual response frequency and the weighted individual gain as the response frequency and the stationary gain respectively.

Furthermore, it is possible to arrange, for example, a configuration comprising a current limiting section and a compensation signal generating section shown in FIG. 2 instead of the response control section. In this case, the characteristic changing section calculates only the coefficients of the transfer function of the feedback control section. Consequently, it is possible to integrate a conventional method for improving the characteristic into the present invention, and at the same time, to reduce an operation amount of the characteristic changing section.

EXPLANATION OF REFERENCE NUMERALS 1 steering wheel
2 column shaft (steering shaft, handle shaft)
9 feedback section
10 torque sensor
12 vehicle speed sensor
14 steering angle sensor
20 motor
30 control unit (ECU)
31 current command value calculating section
33 current limiting section
34 compensation signal generating section
35 PI-control section
36 PWM-control section
37 inverter
38 motor current detector
40, 80, 90 characteristic changing section
41, 81, 91 response frequency calculating section
42, 82, 92 stationary gain calculating section
43 coefficient calculating section
50 response control section
60 feedback control section
71 rotation sensor
72 motor angular velocity calculating section
93 priority determining section
411, 412, 413 individual response frequency calculating section
414, 415, 423, 424 maximum value choosing section
421, 422 individual gain calculating section
431 feedback control coefficient calculating section
432 response control coefficient calculating section
811, 812, 813, 814 change amount limiting section
815, 816, 817, 818 memory
911, 912, 913, 914, 915, 916, 917, 918, 921, 922, 923, 924, 925,
926 multiplier

The invention claimed is:

1. A motor control unit that comprises a current command value calculating section that calculates a current command value of a motor applying a steering assist torque to a steering system of a vehicle, and a feedback section that controls a motor current flowing to said motor through a feedback mechanism based on said current command value, comprising:
a control unit state detecting section that detects at least one state of said motor control unit, and outputs said state as a control unit state; and
a characteristic changing section that changes a setting of a closed loop response characteristic of said feedback section in real time depending on said control unit state;
wherein said characteristic changing section comprises:
a stationary gain calculating section that calculates a set value of stationary gain of said closed loop response characteristic depending on said control unit state;
a response frequency calculating section that calculates a set value of a response frequency of said closed loop response characteristic depending on said control unit state; and
a coefficient calculating section that calculates coefficients of a transfer function of a control section in said feedback section, said coefficients being used to achieve each set value of said stationary gain and said response frequency.

2. The motor control unit according to claim 1, wherein a change amount of calculated said set value is limited so as not to exceed a predetermined value in at least one between said response frequency calculating section and said stationary gain calculating section.

3. The motor control unit according to claim 1, wherein said motor control unit calculates an individual set value according to said control unit state in at least one between said response frequency calculating section and said stationary gain calculating section, comprises a priority determining section that calculates a set priority for said control unit state, calculates a final set value depending on said individual set value and said set priority, and inputs said final set value into said coefficient calculating section.

4. The motor control unit according to claim 2, wherein said motor control unit calculates an individual set value according to said control unit state in at least one between said response frequency calculating section and said stationary gain calculating section, comprises a priority determining section that calculates a set priority for said control unit state, calculates a final set value depending on said individual set value and said set priority, and inputs said final set value into said coefficient calculating section.

5. The motor control unit according to claim 1, wherein said motor control unit calculates an individual set value according to said control unit state in at least one between said response frequency calculating section and said stationary gain calculating section, and inputs a maximum value among said individual set values into said coefficient calculating section.

6. The motor control unit according to claim 2, wherein said motor control unit calculates an individual set value according to said control unit state in at least one between said response frequency calculating section and said stationary gain calculating section, and inputs a maximum value among said individual set values into said coefficient calculating section.

7. A motor control unit that comprises a current command value calculating section that calculates a current command value of a motor applying a steering assist torque to a steering system of a vehicle, and a feedback section that controls a motor current flowing to said motor through a feedback mechanism based on said current command value, comprising:
a control unit state detecting section that detects at least one state of said motor control unit, and outputs said state as a control unit state; and a characteristic changing section that changes a setting of a closed loop response characteristic of said feedback section in real time depending on said control unit state;

wherein a configuration of said feedback section is a configuration of two-degree-of-freedom control where said closed loop response characteristic and a command value response characteristic are possible to set individually; and wherein said characteristic changing section calculates a setting for changing a closed loop response stationary gain and a closed loop response frequency as said setting of said closed loop response characteristic by using a predefined relationship between said control unit state and said closed loop response stationary gain and a predefined relationship between said control unit state and said closed loop response frequency, and calculates a setting for changing a command value response stationary gain and a command value response frequency as a setting of said command value response characteristic by using a predefined relationship between said control unit state and said command value response stationary gain and a predefined relationship between said control unit state and said command value response frequency.

8. The motor control unit according to claim 7, wherein said characteristic changing section comprises:

a stationary gain calculating section that calculates set values of said closed loop response stationary gain and said command value response stationary gain depending on said control unit state;

a response frequency calculating section that calculates set values of said closed loop response frequency and said command value response frequency depending on said control unit state; and a coefficient calculating section that calculates coefficients of a transfer function of a control section in said feedback section, said coefficients being used to achieve each set value of said closed loop response stationary gain, said command value response stationary gain, said closed loop response frequency and said command value response frequency.

9. The motor control unit according to claim 8, wherein a change amount of calculated said set value is limited so as not to exceed a predetermined value in at least one between said response frequency calculating section and said stationary gain calculating section.

10. The motor control unit according to claim 8, wherein said motor control unit calculates an individual set value according to said control unit state in at least one between said response frequency calculating section and said stationary gain calculating section, comprises a priority determining section that calculates a set priority for said control unit state, calculates a final set value depending on said individual set value and said set priority, and inputs said final set value into said coefficient calculating section.

11. The motor control unit according to claim 9, wherein said motor control unit calculates an individual set value according to said control unit state in at least one between said response frequency calculating section and said stationary gain calculating section, comprises a priority determining section that calculates a set priority for said control unit state, calculates a final set value depending on said individual set value and said set priority, and inputs said final set value into said coefficient calculating section.

12. The motor control unit according to claim 8, wherein said motor control unit calculates an individual set value according to said control unit state in at least one between said response frequency calculating section and said stationary gain calculating section, and inputs a maximum value among said individual set values into said coefficient calculating section.

13. The motor control unit according to claim 9, wherein said motor control unit calculates an individual set value according to said control unit state in at least one between said response frequency calculating section and said stationary gain calculating section, and inputs a maximum value among said individual set values into said coefficient calculating section.

14. The motor control unit according to claim 1, wherein said control unit state is at least one among said current command value, said motor current, a motor angular velocity, a motor angular acceleration and a motor temperature.

15. The motor control unit according to claim 7, wherein said control unit state is at least one among said current command value, said motor current, a motor angular velocity, a motor angular acceleration and a motor temperature.

16. An electric power steering apparatus that is equipped with the motor control unit according to claim 1, wherein said control unit state is at least one among said current command value, said motor current, a motor angular velocity, a motor angular acceleration, a motor temperature, a steering torque, a steering angle, a steering angular velocity and a vehicle speed.

17. An electric power steering apparatus that is equipped with the motor control unit according to claim 7, wherein said control unit state is at least one among said current command value, said motor current, a motor angular velocity, a motor angular acceleration, a motor temperature, a steering torque, a steering angle, a steering angular velocity and a vehicle speed.

* * * * *